US012726241B2

(12) United States Patent
Mei et al.

(10) Patent No.: US 12,726,241 B2
(45) Date of Patent: Sep. 1, 2026

(54) GROUPING OF DEMODULATION REFERENCE SIGNAL PORTS FOR CO-SCHEDULED USER EQUIPMENT

(71) Applicant: ZTE Corporation, Shenzhen (CN)

(72) Inventors: Meng Mei, Shenzhen (CN); Bo Gao, Shenzhen (CN); Shujuan Zhang, Shenzhen (CN); Ke Yao, Shenzhen (CN); Yang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 330 days.

(21) Appl. No.: 18/520,303

(22) Filed: Nov. 27, 2023

(65) Prior Publication Data

US 2024/0097766 A1 Mar. 21, 2024

Related U.S. Application Data

(63) Continuation of application No. PCT/CN2022/110691, filed on Aug. 5, 2022.

(51) Int. Cl.

*H04B 7/0456* (2017.01)
*H04L 5/00* (2006.01)
*H04B 7/06* (2006.01)

(52) U.S. Cl.

CPC ......... *H04B 7/0456* (2013.01); *H04L 5/0051* (2013.01); *H04B 7/063* (2013.01); *H04B 7/0639* (2013.01); *H04L 5/0016* (2013.01)

(58) Field of Classification Search

CPC .... H04B 7/0639; H04B 7/063; H04B 7/0452; H04B 7/0456; H04B 7/0697;

(Continued)

(56) References Cited

U.S. PATENT DOCUMENTS

2018/0041320 A1 2/2018 Jin et al.
2019/0036589 A1 1/2019 Ren et al.

(Continued)

FOREIGN PATENT DOCUMENTS

CA 3 185 632 A1 3/2022
CN 106162890 A 11/2016

(Continued)

OTHER PUBLICATIONS

EPO, Extended European Search Report for European Application No. 22 941 862.9, mailed on Oct. 8, 2024, 25 pages.

(Continued)

*Primary Examiner* — Michael K Phillips
(74) *Attorney, Agent, or Firm* — Perkins Coie

(57) ABSTRACT

Methods, apparatus, and systems that relate to grouping the Demodulation Reference Signal (DMRS) ports are disclosed so as to enable efficient demodulation and/or channel interference estimation by the terminal device. In one example aspect, a method for wireless communication includes transmitting, by a base station, a signaling message to a target terminal device indicating at least two groups of antenna ports associated with a Demodulation Reference Signal (DMRS). The at least two groups of antenna ports share no common antenna port. The method also includes performing, by the base station, a communication with a target terminal device based on the signaling message.

12 Claims, 8 Drawing Sheets

(58) Field of Classification Search
CPC . H04L 5/0016; H04L 5/0051; H04L 25/0224; H04L 27/26035
See application file for complete search history.

(56) References Cited

U.S. PATENT DOCUMENTS

| | | | |
|---|---|---|---|
| 2019/0229871 | A1 | 7/2019 | Shi et al. |
| 2020/0228263 | A1 | 7/2020 | Khoshnevisan et al. |
| 2020/0322833 | A1* | 10/2020 | Hu .................... H04W 28/0263 |
| 2020/0374017 | A1* | 11/2020 | Dou ...................... H04L 5/0053 |
| 2020/0382182 | A1* | 12/2020 | Zhang ..................... H04L 5/026 |
| 2021/0306037 | A1 | 9/2021 | John Wilson et al. |
| 2022/0006582 | A1 | 1/2022 | Yamada et al. |
| 2022/0150019 | A1* | 5/2022 | Xiao ..................... H04L 5/0053 |
| 2022/0311574 | A1* | 9/2022 | Gao ...................... H04L 5/0051 |
| 2024/0080156 | A1* | 3/2024 | Gao ...................... H04L 5/0048 |
| 2025/0070935 | A1* | 2/2025 | Cheng .................. H04B 7/0452 |
| 2025/0112675 | A1* | 4/2025 | Wang ................... H04B 7/0639 |
| 2025/0202652 | A1* | 6/2025 | Matsumura ........... H04W 72/04 |
| 2025/0211387 | A1* | 6/2025 | Gao ...................... H04L 5/0051 |
| 2025/0261265 | A1* | 8/2025 | Huang .................... H04W 8/22 |

FOREIGN PATENT DOCUMENTS

| | | | |
|---|---|---|---|
| CN | 107889258 | A | 4/2018 |
| CN | 110495225 | A | 11/2019 |
| WO | 2022061699 | A1 | 3/2022 |

OTHER PUBLICATIONS

3GPP TS 38.212, "3rd Generation Partnership Project; Technical Specification Group Radio Access Network; NR; Multiplexing and channel coding (Release 15)," V15.2.0, Jun. 2018, 98 pages.

International Search Report and Written Opinion for International Application No. PCT/CN2022/110691, mailed on Dec. 21, 2022 (9 pages).

LG Electronics, "Text proposals on enhancements on multi-TRP/panel transmission," 3GPP TSG RAN WG1 #100bis, eMeeting, R1-2001913, Apr. 20-30, 2020, 15 pages.

CATT, "On increased number of orthogonal DMRS ports," 3GPP TSG RAN WG1 #109-e, eMeeting, R1-2203444 , May 9-10, 2022, 5 pages.

LG Electronics, "Increased No. of orthogonal DMRS ports," 3GPP TSG RAN WG1 #109-e, eMeeting, R1-2204144, May 9-20, 2022, 4 pages.

Moderator (CMCC), "Summary#6 on mechanisms to support group scheduling for RRC_Connected UEs for NR MBS," 3GPP TSG RAN WG1 #108-e, eMeeting, R1-2202642, Feb. 21-Mar. 3, 2022, 175 pages.

Moderator (NTT Docomo), "FL summary on DMRS#3," 3GPP TSG RAN WG1 #109-e, eMeeting, R1-2205424, May 9-20, 2022, 37 pages.

NEC, "Discussion on increased number of orthogonal DMRS ports," 3GPP TSG RAN WG1 #109-e, eMeeting, R1-2203684, May 9-20, 2022, 2 pages.

Qualcomm Incorporated, "Design for increased No. of orthogonal DMRS ports," 3GPP TSG RAN WG1 #109-e, eMeeting, R1-2205017, May 9-20, 2022, 7 pages.

Samsung, "Views on DMRS enhancements," 3GPP TSG RAN WG1 #109-e, eMeeting, R1-2203891, May 9-20, 2022, 11 pages.

Xiaomi, "Discussion on DMRS enhancement," 3GPP TSG RAN WG1 #109-e, eMeeting, R1-2205159, May 9-20, 2022, 14 pages.

ZTE, "DMRS enhancement for UL/DL MU-MIMO and 8 Tx UL SU-Mimo," 3GPP TSG RAN WG1 #109-e, eMeeting, R1-2203266, May 9-20, 2022, 6 pages.

MOIP First Office Action from Korean Patent Application No. 10-2025-7002408, dated Jun. 1, 2026, with English summary, 10 pages.

* cited by examiner

Existing DMRS type 2, two front loaded DMRS symbols,
4 DMRS RE per port per symbol

| Symbol #n | #n+1 |
|---|---|
| 11 | 11 |
| 10 | 10 |
| 9 | 9 |
| 8 | 8 |
| 7 | 7 |
| 6 | 6 |
| 5 | 5 |
| 4 | 4 |
| 3 | 3 |
| 2 | 2 |
| 1 | 1 |
| 0 | 0 |

CDM group#2 in which port 4, 5, 10, 11 are mapped

CDM group#1 in which port 2, 3, 8, 9 are mapped

CDM group#0 in which port 0, 1, 6, 7 are mapped

FIG. 1B port

GROUPING OF DEMODULATION REFERENCE SIGNAL PORTS FOR CO-SCHEDULED USER EQUIPMENT

CROSS-REFERENCE TO RELATED APPLICATIONS

This application is a continuation of International Patent Application No. PCT/CN2022/110691, filed on Aug. 5, 2022, the contents of which are incorporated herein by reference in their entirety.

TECHNICAL FIELD

This patent document is directed to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that related to the grouping of Demodulation Reference Signal (DMRS) ports when a User Equipment (UE) is co-scheduled with other UEs.

In one example aspect, a method for wireless communication includes transmitting, by a base station, a signaling message to a target terminal device indicating at least two groups of antenna ports associated with a Demodulation Reference Signal (DMRS). The at least two groups of antenna ports share no common antenna port. The method also includes performing, by the base station, a communication with a target terminal device based on the signaling message.

In another example aspect, a method for wireless communication includes receiving, by a target terminal device, a signaling message from a base station indicating at least two groups of antenna ports associated with a Demodulation Reference Signal (DMRS). The at least two groups of antenna ports share no common antenna port. The method also includes performing, by the target terminal device, a communication with a terminal device based on the signaling message.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 1B illustrates an example type2 DMRS with two front-loaded DMRS symbols.

DETAILED DESCRIPTION

Section headings are used in the present document only to improve readability and do not limit scope of the disclosed embodiments and techniques in each section to only that section. Furthermore, some embodiments are described with reference to Third Generation Partnership Project (3GPP) New Radio (NR) standard ("5G") for ease of understanding and the described technology may be implemented in different wireless system that implement protocols other than the 5G protocol.

Figure 1A:
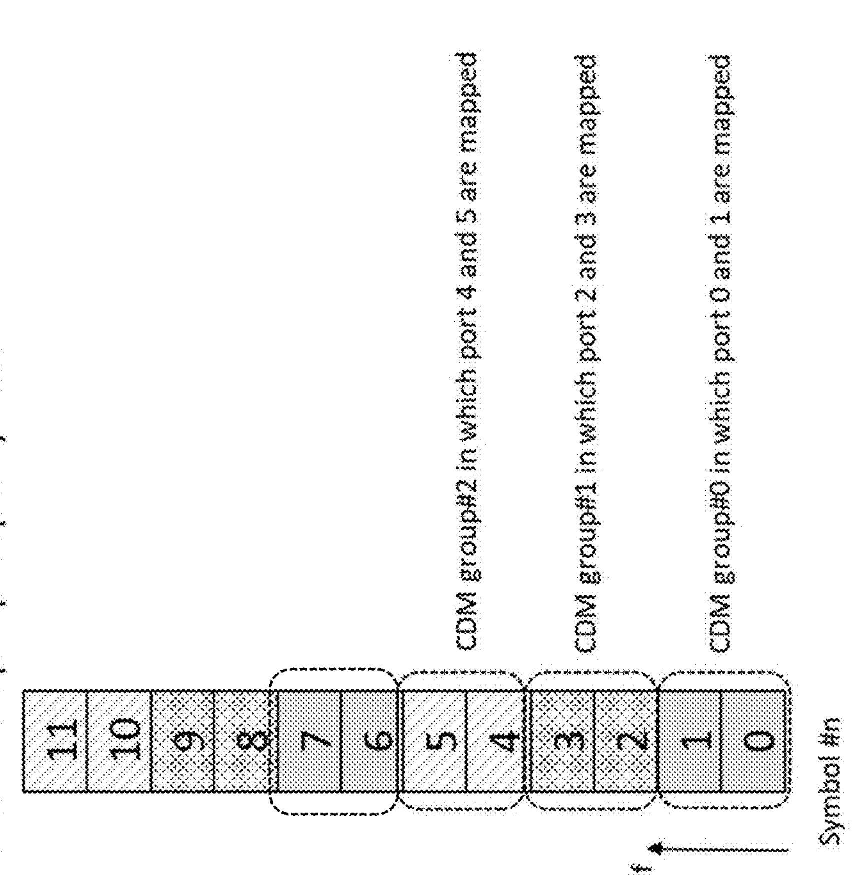
FIG. 1A illustrates an example type2 Demodulation Reference Signal (DMRS) with one front-loaded DMRS symbol.

In wireless communication systems, Demodulation Reference Signal (DMRS) is used by the receiver to perform channel estimation and demodulation of the associated channel. Currently, two types of DMRS are supported: DMRS type 1 and DMRS type 2. For type 1 DMRS, the minimum resource element group in frequency domain is one resource element (RE). For type 2 DMRS, the minimum resource element group in frequency domain is two consecutive REs. FIG. 1A illustrates an example type2 DMRS with one front-loaded DMRS symbol. One DMRS symbol (also referred to as the one front-loaded DMRS symbol) is configured by Radio Resource Control (RRC) signaling or indicated by Downlink Control Information (DCI) signaling. Two adjacent REs in the frequency domain form one DMRS Code Division Multiplexing (CDM) group, e.g., by applying Frequency-Domain (FD) Orthogonal Cover Coding (OCC) having a length of two. In this specific example, DMRS port 0 and 1 are multiplexed in CDM group #0. The CDM group #0 is repeated twice, one being in RE #0 and #1 and the other one being in RE #6 and #7 (e.g., port 0 and portl are multiplexed in RE #0 and RE #1 in the CDM manner, and port 0 and port 1 are also multiplexed in RE #6 and RE #7 in the CDM manner). Six DMRS ports can be supported in the case of one DMRS symbol, and the density of each DMRS port is 4 REs per PRB per symbol.

FIG. 1B illustrates an example type2 DMRS with two front-loaded DMRS symbols. Two DMRS symbols (also referred to as the two front-loaded DMRS symbols) are configured by the RRC signaling or indicated by the DCI signaling. Four adjacent REs form one DMRS CDM group, e.g., by applying FD-OCC having a length of two and Time-Domain (TD) OCC having a length of two on consecutive symbols. In this specific example, DMRS port 0, 1, 6 and 7 are multiplexed in CDM group #0 in the CDM manner, and the CDM group #0 is repeated twice. Twelve DMRS ports are supported in the case of two DMRS symbols, and the density of each DMRS port is 8 REs per PRB per two symbols.

Figure 1C:
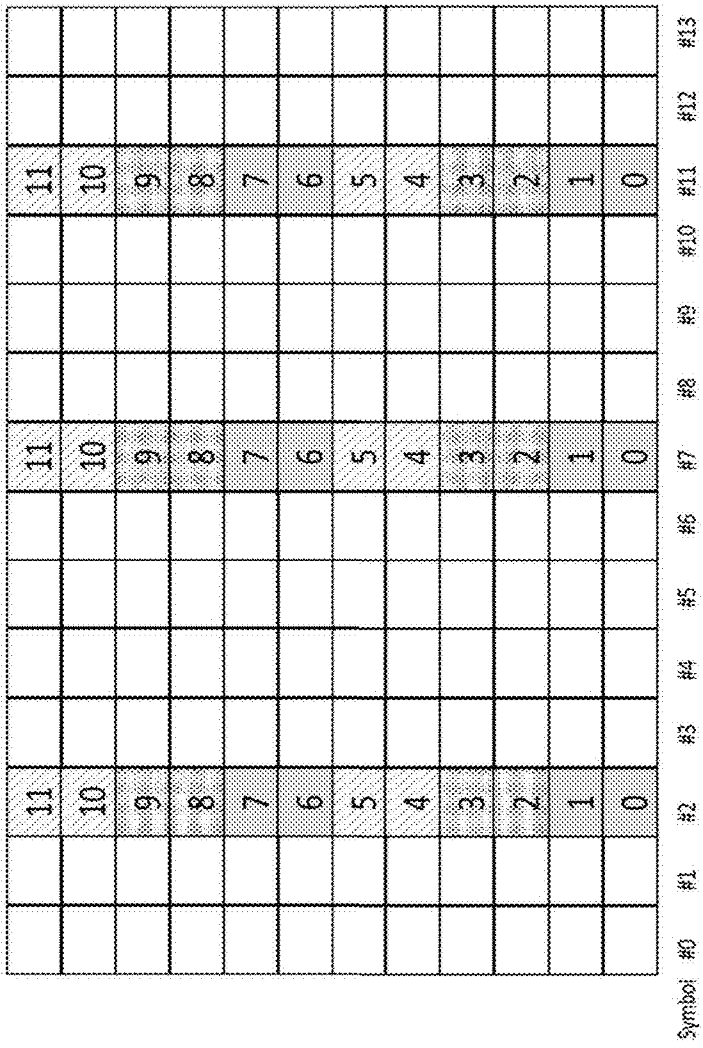
FIG. 1C illustrates another example DMRS with three DMRS symbols.

FIG. 1C illustrates another example DMRS with three DMRS symbols. In some embodiments, one front loaded DMRS symbol can be configured in a slot, and one or more additional DMRS symbols (e.g., one or two DMRS symbols) can be configured.

With the advance of wireless communication, there exists a need to support more DMRS ports, along with other techniques, to improve channel demodulation performance and provide reliable, robust communications. The maximum number of DMRS ports supported by the base station is often greater than the maximum number of DMRS ports supported by a UE, allowing co-scheduling of multiple UEs at the same time. This patent discloses techniques that can be implemented to group the DMRS ports so that the UE can efficiently determine which DMRS port(s) are used for channel demodulation and/or which DMRS port(s) can be used for interference estimation for co-scheduled UEs.

Figure 2A:
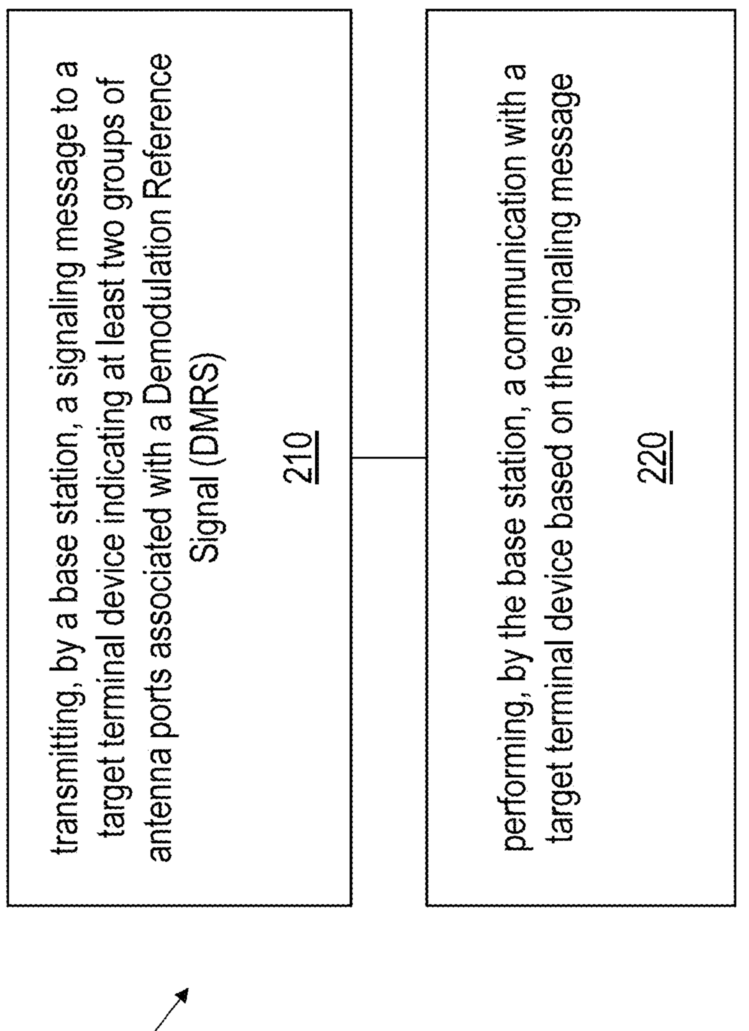
FIG. 2A illustrates a method for wireless communication in accordance with one or more embodiments of the present technology.

FIG. 2A illustrates a method for wireless communication in accordance with one or more embodiments of the present technology. The method 200 includes, at operation 210, transmitting, by a base station, a signaling message to a target terminal device indicating at least two groups of antenna ports associated with a Demodulation Reference Signal (DMRS). The at least two groups of antenna ports share no common antenna port. The method 200 includes, at operation 220, performing, by the base station, a communication with a target terminal device based on the signaling message.

Figure 2B:
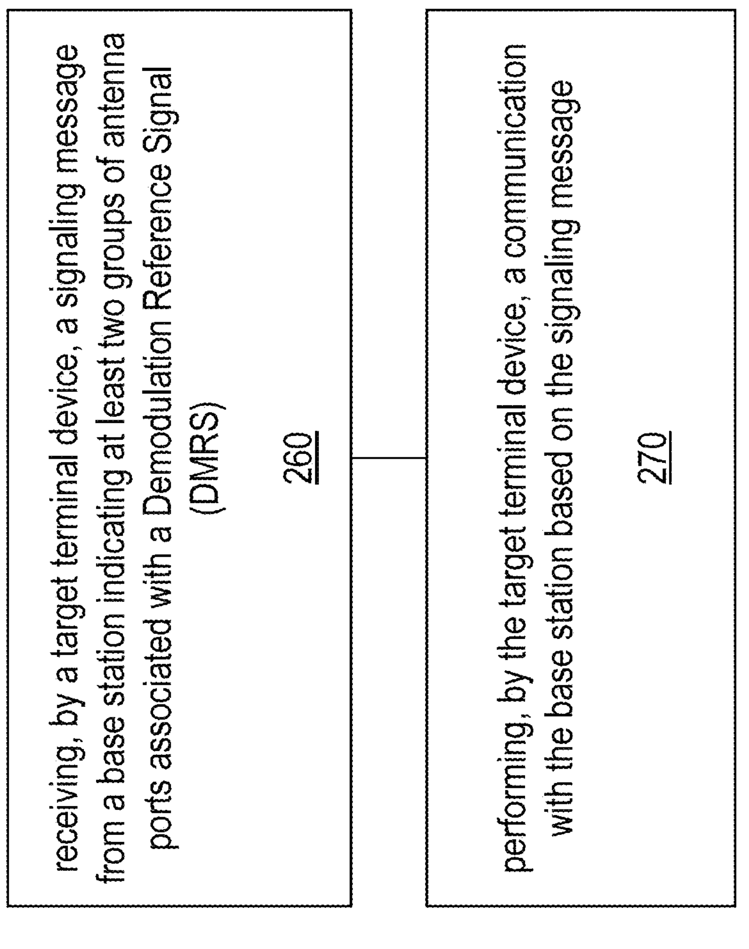
FIG. 2B illustrates another method for wireless communication in accordance with one or more embodiments of the present technology.

FIG. 2B illustrates a method for wireless communication in accordance with one or more embodiments of the present technology. The method 250 includes, at operation 260, receiving, by a target terminal device, a signaling message from a base station indicating at least two groups of antenna ports associated with a Demodulation Reference Signal (DMRS). The at least two groups of antenna ports share no common antenna port. The method 250 includes, at operation 270, performing, by the target terminal device, a communication with the base station based on the signaling message.

In some embodiments, the at least two groups of antenna ports correspond to the transmissions of the co-scheduled terminal devices. The at least two groups of antenna ports are organized based on a predefined or configured set of DMRS ports. The at least two groups of antenna ports (e.g., DMRS ports indicated in the signaling message corresponding to two codewords) are associated with the communication with the target terminal device. At least one other group of antenna port (e.g., remaining DMRS ports in the predefined or configured set) is associated with another communication with another co-scheduled terminal device. In some embodiments, the predefined or configured set of DMRS ports comprises at least one of a total number of DMRS ports configured for all terminal devices co-scheduled with the target terminal device, up to 16 orthogonal DMRS ports in response to the DMRS being a type 1 DMRS, or up to 24 orthogonal DMRS ports in response to the DMRS being a type 2 DMRS. In some embodiments, the second group of antenna ports is associated with at least one of: Code Division Multiplexing (CDM) groups for all co-scheduled terminal devices except for one or more CDM groups configured for the target terminal device, or DMRS ports for all co-scheduled terminal devices except for one or more DMRS ports configured for the target terminal device.

In some embodiments, the signaling message is configured to schedule at least two codewords, each codeword corresponding to one of the at least two groups of antenna ports. In some embodiments, the signaling message comprises two separate fields indicating the at least two groups of antenna ports. Each of the at least two groups of antenna ports is associated with a Code Division Multiplexing (CDM) group. In some embodiments, each of the at least two groups of antenna ports includes antenna ports to which time-domain orthogonal cover coding is inapplicable.

In some embodiments, a first group of antenna ports corresponding to a first codeword is determined based on $\lfloor R/2 \rfloor$ and a second group of antenna ports corresponding to a second codeword is determined based on ceil $\lceil R/2 \rceil$, where R represents a total number of ranks configured for the communication. In some embodiments, the signaling message comprises a transmit precoding matrix index (TPMI) field, and a rank of each of at least two codewords is based on a coherent codebook indicate by the TPMI field. In some embodiments, the signaling message further comprises at least two transmit precoding matrix index (TPMI) fields or at least two sounding reference signal resource indicator (SRI) fields, each of the at least two TPMI fields or the at least two SRI fields corresponding to a codeword. In some embodiments, a rank indicated by a TPMI field or an SRI field is associated with a group of antenna ports. In some embodiments, a rank corresponding to the at least two codewords is determined based on one of: a sum of ranks indicated by the at least two TPMI fields or the at least two SRI fields, a maximum value of ranks indicated by the at least two TPMI fields or the at least two SRI fields, or a rank indicated by a first TPMI field or a first SRI field.

In some embodiments, at least two PTRS-DMRS association fields are associated with the at least two DMRS port groups, and each of the at least two PTRS-DMRS association fields is associated with one of the at least two DMRS port groups. In some embodiments, a second PTRS-DMRS association field is enabled based on the at least one of: (1) the communication is associated with at least two DMRS port groups, or (2) the communication is associated with two codewords.

Some examples of the disclosed techniques are further described below.

Embodiment 1

In some embodiments, the DMRS ports can be split into several groups, each corresponding to a transmission or communication with a UE that is co-scheduled with other UEs. The groups do not share any common DMRS ports to avoid multiple UEs using the same DMRS port, which can cause undesirable interference. For example, up to 16 total DMRS ports can be supported for type-1 DMRS and up to 24 total DMRS ports can be supported for type-2 DMRS. If a UE supports 8 DMRS ports, there still exist many DMRS ports that can be co-scheduled with other UEs. Three UEs that support up to 8 DMRS ports can be co-scheduled with up to 24 total DMRS ports for type-2 DMRS. The DMRS ports are organized into three groups, each corresponding to a communication of a UE. The groups have no common elements (that is, the intersection of the DMRS port groups is null).

In some embodiments, a target UE can determine whether the DMRS ports are organized in groups based on the number of DMRS ports indicated by the base station (e.g., via the antenna ports field in a DCI signaling message). Table 1 shows an example of DMRS port mapping based on the value of the antenna ports field. For single-symbol DMRS (e.g., having only one OFDM symbol or one front loaded systems), only up to 8 DMRS ports are supported. When the antenna fields indicates that the UE is configured with more than 4 DMRS ports (e.g., value 5 in Table 1), only one UE can be scheduled. Correspondingly, the UE can determine that no other UEs is co-scheduled and there is no need to detect the interference using the other DMRS ports.

TABLE 1

| Two Codewords: Codeword 0 enabled, Codeword 1 enabled | | | |
|---|---|---|---|
| Value | Number of DMRS CDM group(s) without data | DMRS port(s) | Number of front-load symbols |
| 0 | 2 | 0-4 | 2 |
| 1 | 2 | 0, 1, 2, 3, 4, 6 | 2 |
| 2 | 2 | 0, 1, 2, 3, 4, 5, 6 | 2 |
| 3 | 2 | 0, 1, 2, 3, 4, 5, 6, 7 | 2 |
| 4 | 2 | 8-12 | 1/2 |
| 5 | 2 | 8, 9, 10, 11, 12, 14 | 1/2 |
| 6 | 2 | 8, 9, 10, 11, 12, 13, 14 | 1/2 |
| 7 | 2 | 8-15 | 1/2 |
| 8 | 1 | 0, 1, 9, 10 | 2 |
| 9 | 1 | 0, 1, 2, 3, 4, 6 | 2 |
| 10 | 1 | 0, 1, 2, 3, 4, 5, 6 | 2 |
| 11 | 1 | 0, 1, 2, 3, 4, 5, 6, 7 | 2 |
| 12 | 1 | 8-12 | 2 |
| 13 | 1 | 8, 9, 10, 11, 12, 14 | 2 |
| 14 | 1 | 8, 9, 10, 11, 12, 13, 14 | 2 |
| 15 | 1 | 8-15 | 2 |
| 16-31 | reserved | reserved | reserved |

In some embodiments, the DMRS port groups can be determined based on the CDM groups. For example, for double-symbol DMRS, up to 8 DMRS ports can be supported in one CDM group. A predefined rule can specify that, when one UE is configured with more than four layers for a transmission, to enable co-scheduling of the multiple UEs, the DMRS ports configured for other UEs cannot be from the same CDM group. In such cases, the DMRS ports can be organized into groups such that each group of DMRS ports corresponds to a CDM group. The grouping of the DMRS ports according to CDM groups allow at least another UE with more than four DMRS ports in this CDM group to be co-scheduled.

In some embodiments, the DMRS port groups can be determined based on codewords. Currently, the UE may assume that all the remaining antenna ports are not associated with transmission(s) of another UE for type 1 or type 2 DMRS scheduled with two codewords. However, with new DMRS mapping scheme(s) supporting more DMRS ports, the remaining antenna ports can be associated with transmission(s) of another UE even when the DMRS is scheduled to two codewords. For example, the UE can receive, e.g., in a DCI signaling, an indication of DMRS port groups corresponding to the codewords (e.g., two groups associated with two codewords). The UE can derive that remaining antenna ports (not indicated in the DCI signaling) for all the CDM groups or for all the remaining CDM groups except for the CDM including the DMRS ports indicated to the UE are associated with transmission(s) of other UE(s). The related CDM group information can be indicated in the DCI field associated with DMRS ports and/or the number of DMRS CDM group without data. The transmission(s) of other UE(s) can be configured with one or more codewords.

Embodiment 2

The rank of a communication can be indicated by a transmit precoding matrix index (TPMI) (e.g., for codebook-based transmissions) or a sounding reference signal (SRS) resource indicator (SRI) (e.g., for non-codebook-based transmissions). In some embodiments, the DCI signaling message can be extended to include two TPMI and/or SRI fields to indicate the related TPMI or SRI for a transmission. In some embodiments, each TPMI and/or SRI field can be associated with a corresponding codeword if two codewords are configured for the transmission. Whether the DCI signaling message supports two TPMI/SRI fields can be configured using a higher layer signaling message, such as a Radio Resource Control (RRC) signaling message.

For example, a TPMI field can indicate the codebook and rank information for a codebook-based uplink transmission. When two codewords are configured for the uplink transmission, two TPMI fields can be included in the DCI signaling message, with each codeword being associated with a respective TPMI field. The rank information indicated by the TPMI field can also indicate the DMRS port number of the associated codeword.

In some embodiments, two antenna port fields can be used to indicate the DMRS port(s) for the two codewords, and the rank indicated by each of the TPMI and/or SRI fields is associated with a corresponding antenna port field. Support for two antenna ports fields can also be configured using a higher layer signaling message, such as an RRC signaling message. In some embodiments, the first TPMI field indicates the codebook and the rank information for the first codeword, and the first antenna port field indicates the DMRS port(s) of the first codeword. The second TPMI indicates the codebook and the rank information for the second codeword, and the second antenna ports field indicates the DMRS port(s) of the second codeword.

In such cases, the transmission can be split into two groups, with each group being associated to one codeword. In some embodiments, the DMRS ports indicated by the two antenna port fields are independent from each other. In some embodiments, the two antenna port fields can have different values to indicate different DMRS ports for the two codewords. For example, ff the DCI signaling message includes two antenna port fields, the first antenna port field can indicate the DMRS ports of the first codeword associate with the first TPMI/SRI field (e.g., DMRS port index of #0-3). The second antenna port field can indicate the DMRS ports of the second codeword associated with the second TPMI/SRI field (e.g., DMRS port index #4-8).

In some embodiments, the two antenna port fields can have the same values. For example, a total of six DMRS ports are supported in an uplink transmission. According to the TPMI indication, three DMRS ports (e.g., port index #0-2) are supported so the first antenna port field can indicate three DMRS ports of the associated codeword. The second antenna port field can indicate the same DMRS ports. In some embodiments, the DMRS ports indicated by the second antenna port field and the DMRS port index of the second antenna port field can be derived based DMRS port index #0-2.

In some embodiments, new DMRS mapping scheme can be adopted to support more DMRS ports (e.g., up to 24 DMRS ports). If one UE is configured with two codewords, a total of up to 8 DMRS ports can be indicated to this UE. The DMRS ports from one CDM group can correspond to one codeword, and the DMRS ports of other CDM group(s) can correspond to the other codeword. For example, for single-symbol DMRS, two CDM groups are supported for type-1 DMRS with FD-OCC=4 and without TD-OCC. Each CDM group is associated with up to 4 DMRS ports, correspondingly to a respective codeword.

For double-symbol DMRS, one UE is configured with DMRS port from one CDM group. For double-symbol DMRS with two consecutive DMRS symbol having TD-OCC=2, up to 8 DMRS ports are supported in one CDM group. The first four DMRS ports in a CDM group can be associated with the first codeword, and the other four DMRS ports in the CDM group can be associated with the second codeword. Remaining DMRS ports from other CDM group(s) can be indicated to other UE(s). For example, for double-symbol DMRS, one UE is configured with DMRS ports, e.g., port #{0, 1, 2, 3, 8, 9, 10, 11}, and another UE is configured with remaining DMRS ports, e.g., port #{4, 5, 6, 7, 12, 13, 14, 15}. In this case, DMRS ports #{0, 1, 8, 9} in one CDM group are associated with one codeword, and the DMRS ports #{2, 3, 10, 11} of the other CDM group are associated with the other codeword.

In some embodiments, only one antenna port field is configured in the DCI signaling message. The two TPMI and/or SRI fields can indicate the rank information, and the antenna ports field indicates the related DMRS port(s). The number of DMRS ports for the transmission (e.g., the total rank) can be calculated based on the sum of the ranks indicated by the two TPMI or SRI fields. In some embodiments, whether the rank information is calculated based the two RIs indicated by the two TPMI/SRI fields respectively or only one RI (e.g., a smaller or a larger value selected based on the two RIs indicated by the two TPMI/SRI fields) can be configured by the base station via a signaling message (e.g., Medium Access Control (MAC) Control Element (CE) or DCI signaling).

Embodiment #3

Figures 3A, 3B, 3C, 3D, 3E, 3F, 3G:
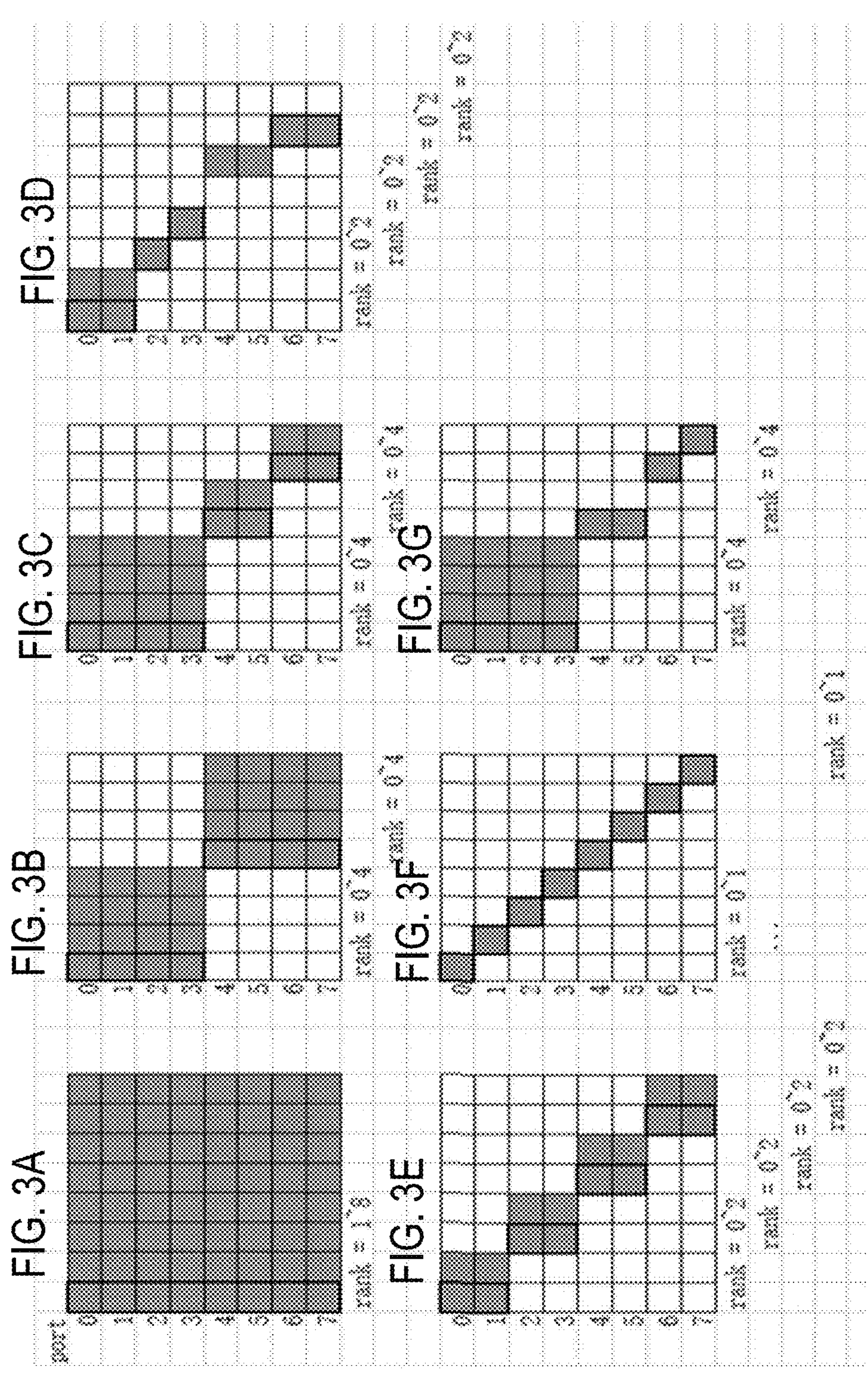
FIG. 3A illustrates a full coherent codebook-based transmission.
FIG. 3B illustrates a partial coherent codebook-based transmission.
FIG. 3C illustrates another partial coherent codebook-based transmission.
FIG. 3D illustrates another partial coherent codebook-based transmission.
FIG. 3E illustrates another partial coherent codebook-based transmission.
FIG. 3F illustrates a non-coherent codebook-based transmission.
FIG. 3G illustrates yet another partial coherent codebook-based transmission.

In some embodiments, the DCI signaling message includes a single TPMI/SRI field to support transmissions having more than four layers. The DCI signaling message can include two antenna ports fields. For example, for codebook-based transmission, the number of DMRS ports associated with the codebook can be indicated by the TPMI. If partial coherent codebook is supported, some of the layers can share a first coherent codebook and other DMRS ports can share another coherent codebook. FIG. 3A-G illustrates example codebook-based transmissions in accordance with one or more embodiments of the present technology. FIG. 3A illustrates a full coherent codebook-based transmission. FIG. 3F illustrates a non-coherent codebook-based transmission. FIGS. 3B-3D and 3G illustrate various partial coherent codebook-based transmissions. For example, as shown in FIG. 3B, the first four DMRS ports share a coherent codebook and the other four DMRS ports share another coherent codebook. The DMRS ports associated to different coherent codebooks are associated to different codewords, and can be indicated by the DCI signaling accordingly.

Embodiment #4

The UE can assume that modulation symbols for each of the codewords to be transmitted are mapped onto one or several layers according to predefined codeword-to-layer mapping. In some embodiments, when the DCI signaling includes two antenna ports fields, each antenna ports field indicates the DMRS ports of each codeword. In some embodiments, when the DCI signaling includes only one antenna ports field, specific mapping can be provided to indicate which DMRS port(s) are mapped to which codeword(s).

In some embodiments, the mapping of the first codeword can be decided based on DMRS(1)=floor(total_rank/2), and the mapping of the second codeword can be decide based on DMRS(2)=ceil(total_rank/2). For example, for a 5-layer transmission, the first $\lfloor 5/2 \rfloor=2$ DMRS ports are associated with the first codeword, and the remaining $\lceil 5/2 \rceil=3$ layers are associated with the second codeword. As another example, for a 7-layer transmission, the first $\lfloor 7/2 \rfloor=3$ DMRS ports are associated with the first codeword, and the remaining $\lceil 7/2 \rceil=4$ DMRS ports are associated with the second codeword. For 6 layers or 8 layers uplink transmission, a same number of layers of 3 or 4 for uplink transmission are associated with the two codewords respectively.

Currently, a PTRS-DMRS association field of 2 bits is included in the DCI signaling. When a two-codeword transmission is configured, the DCI signaling message can include additional bits to indicate the association between PTRS and DMRS. For example, in the case of two codewords uplink transmissions, and/or when a total number of 5 or more layers are supported, more than 2 bits can used to indicate the association of PTRS and DMRS. As another example, when only one PTRS is configured and all the indicated DMRS ports share the same PTRS port, 3 or 4 bits can be used to indicate the association. Yet as another example, when more than one PTRS port is configured, one codeword can be associated to one TPMI/SRI, a modulation and coding scheme (MCS), a redundancy version (RV), or a new date indicator (NDI). The first PTRS-DMRS association field can indicate that the DMRS ports mapped to the first codeword are associated with one or two PTRS ports. The second PTRS-DMRS field can indicate that the DMRS associated with the second codeword are associated with one or two PTRS ports when two codeword mapping is configured.

Figure 4:
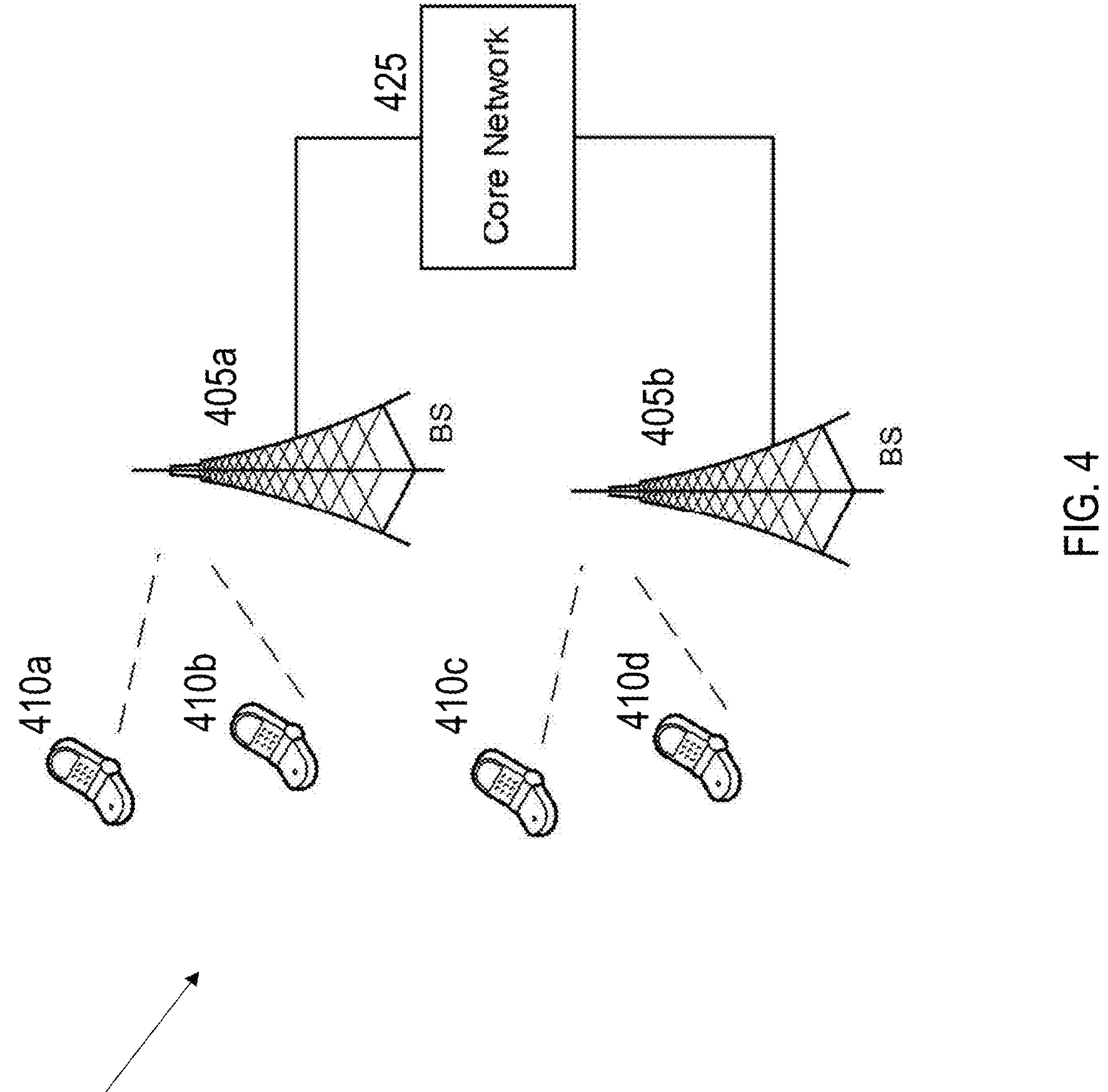
FIG. 4 shows an example of a wireless communication system where techniques in accordance with one or more embodiments of the present technology can be applied.

FIG. 4 shows an example of a wireless communication system 400 where techniques in accordance with one or more embodiments of the present technology can be applied. A wireless communication system 400 can include one or more base stations (BSs) 405*a*, 405*b*, one or more wireless devices (or UEs) 410*a*, 410*b*, 410*c*, 410*d*, and a core network 425. A base station 405*a*, 405*b* can provide wireless service to user devices 410*a*, 410*b*, 410*c* and 410*d* in one or more wireless sectors. In some implementations, a base station 405*a*, 405*b* includes directional antennas to produce two or more directional beams to provide wireless coverage in different sectors. The core network 425 can communicate with one or more base stations 405*a*, 405*b*. The core network 425 provides connectivity with other wireless communication systems and wired communication systems. The core network may include one or more service subscription databases to store information related to the subscribed user devices 410*a*, 410*b*, 410*c*, and 410*d*. A first base station 405*a* can provide wireless service based on a first radio access technology, whereas a second base station 405*b* can provide wireless service based on a second radio access technology. The base stations 405*a* and 405*b* may be co-located or may be separately installed in the field according to the deployment scenario. The user devices 410*a*, 410*b*, 410*c*, and 410*d* can support multiple different radio access technologies. The techniques and embodiments described in the present document may be implemented by the base stations of wireless devices described in the present document.

Figure 5:
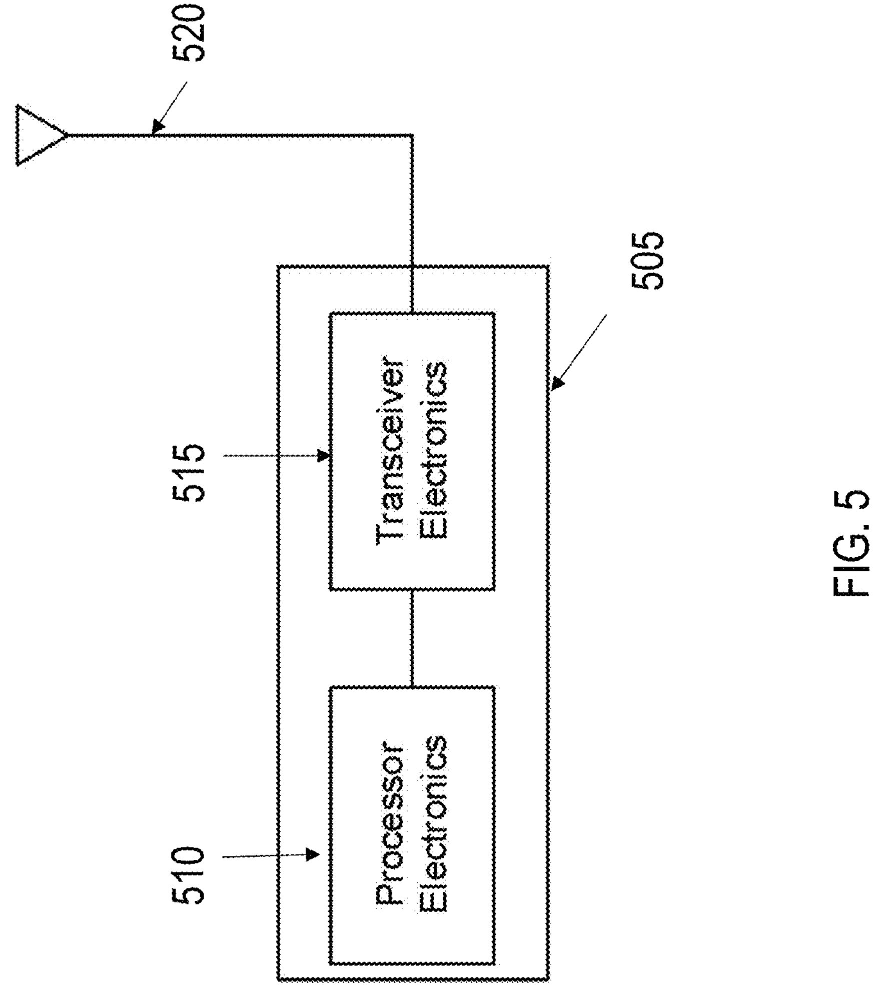
FIG. 5 is a block diagram representation of a portion of a radio station in accordance with one or more embodiments of the present technology can be applied.

FIG. 5 is a block diagram representation of a portion of a radio station in accordance with one or more embodiments of the present technology can be applied. A radio station 505 such as a network node, a base station, or a wireless device (or a user device, UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505. In some embodiments, the radio station 505 may be configured to perform the methods described herein.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:

transmitting, by a base station, at least one signaling message to a target terminal device indicating at least two groups of Demodulation Reference Signal (DMRS) ports, wherein the at least two groups of DMRS ports share no common DMRS port, wherein the at least one signaling message is configured to schedule at least two codewords, each codeword corresponding to one of the at least two groups of DMRS ports, and wherein a first group of DMRS ports corresponding to a first codeword is determined based on a largest integer less than or equal to R/2, and a second group of DMRS ports corresponding to a second codeword is determined based on a smallest integer greater than or equal to R/2, wherein R represents a total number of ranks configured for the communication; and performing, by the base station, a communication with the target terminal device based on the at least one signaling message, wherein the at least two groups of DMRS ports are organized based on a predefined or configured set of DMRS ports and are used for the communication with the target terminal device, and wherein at least one other group of DMRS ports, among remaining DMRS ports in the predefined or configured set excluding the DMRS port groups used for the communication with the target terminal device, is used for another communication with another terminal device co-scheduled with the target terminal device.

2. The method of claim 1, wherein the at least one signaling message further comprises at least two transmit precoding matrix index (TPMI) fields or at least two sounding reference signal resource indicator (SRI) fields, each of the at least two TPMI fields or the at least two SRI fields corresponding to one of the at least two codewords.

3. The method of claim 1, wherein at least one signaling message comprises at least two Phase Tracking Reference Signal (PTRS)-DMRS association fields indicating an association between more than one PTRS port and the at least two groups of DMRS ports.

4. A method for wireless communication, comprising:

receiving, by a target terminal device, at least one signaling message from a base station indicating at least two groups of Demodulation Reference Signal (DMRS) ports, wherein the at least two groups of DMRS ports share no common DMRS port, wherein the at least one signaling message is configured to schedule at least two codewords, each codeword corresponding to one of the at least two groups of DMRS ports, and wherein a first group of DMRS ports corresponding to a first codeword is determined based on a largest integer less than or equal to R/2, and a second group of DMRS ports corresponding to a second codeword is determined based on a smallest integer greater than or equal to R/2, wherein R represents a total number of ranks configured for the communication; and performing, by the target terminal device, a communication with the base station based on the at least one signaling message, wherein the at least two groups of DMRS ports are organized based on a predefined or configured set of DMRS ports and are used for the communication with the base station, and wherein at least one other group of DMRS ports, among remaining DMRS ports in the predefined or configured set excluding the DMRS port groups used for the communication with the base station, is used for another communication between the base station and another terminal device co-scheduled with the target terminal device.

5. The method of claim 4, wherein the at least one signaling message further comprises at least two transmit precoding matrix index (TPMI) fields or at least two sounding reference signal resource indicator (SRI) fields, each of the at least two TPMI fields or the at least two SRI fields corresponding to one of the at least two codewords.

6. The method of claim 4, wherein at least one signaling message comprises at least two Phase Tracking Reference Signal (PTRS)-DMRS association fields indicating an association between more than one PTRS port and the at least two groups of DMRS ports.

7. A communication apparatus, comprising at least one processor configured to:

transmit at least one signaling message to a target terminal device indicating at least two groups of Demodulation Reference Signal (DMRS) ports, wherein the at least two groups of DMRS ports share no common DMRS port, wherein the at least one signaling message is configured to schedule at least two codewords, each codeword corresponding to one of the at least two groups of DMRS ports, and wherein a first group of DMRS ports corresponding to a first codeword is determined based on a largest integer less than or equal to R/2, and a second group of DMRS ports corresponding to a second codeword is determined based on a smallest integer greater than or equal to R/2, wherein R represents a total number of ranks configured for the communication; and perform the communication with the target terminal device based on the at least one signaling message, wherein the at least two groups of DMRS ports are organized based on a predefined or configured set of DMRS ports and are used for the communication with the target terminal device, and wherein at least one other group of DMRS ports, among remaining DMRS ports in the predefined or configured set excluding the DMRS port groups used for the communication with the target terminal device, is used for another communication with another terminal device co-scheduled with the target terminal device.

8. The apparatus of claim 7, wherein the at least one signaling message further comprises at least two transmit precoding matrix index (TPMI) fields or at least two sounding reference signal resource indicator (SRI) fields, each of the at least two TPMI fields or the at least two SRI fields corresponding to one of the at least two codewords.

9. The apparatus of claim 7, wherein at least one signaling message comprises at least two Phase Tracking Reference Signal (PTRS)-DMRS association fields indicating an association between more than one PTRS port and the at least two groups of DMRS ports.

10. A communication apparatus, comprising at least one processor configured to:

receive at least one signaling message from a base station indicating at least two groups of Demodulation Reference Signal (DMRS) ports, wherein the at least two groups of DMRS ports share no common DMRS port, wherein the at least one signaling message is configured to schedule at least two codewords, each codeword corresponding to one of the at least two groups of DMRS ports;

wherein a first group of DMRS ports corresponding to a first codeword is determined based on a largest integer less than or equal to R/2, and a second group of DMRS ports corresponding to a second codeword is determined based on a smallest integer greater than or equal to R/2, wherein R represents a total number of ranks configured for the communication; and perform the communication with the base station based on the at least one signaling message, wherein the at least two groups of DMRS ports are organized based on a predefined or configured set of DMRS ports and are used for the communication with the base station, and wherein at least one other group of DMRS ports, among remaining DMRS ports in the predefined or configured set excluding the DMRS port groups used for the communication with the base station, is used for another communication between the base station and another terminal device co-scheduled with the communication apparatus.

11. The apparatus of claim 10, wherein the at least one signaling message further comprises at least two transmit precoding matrix index (TPMI) fields or at least two sounding reference signal resource indicator (SRI) fields, each of the at least two TPMI fields or the at least two SRI fields corresponding to one of the at least two codewords.

12. The apparatus of claim 10, wherein at least one signaling message comprises at least two Phase Tracking Reference Signal (PTRS)-DMRS association fields indicating an association between more than one PTRS port and the at least two groups of DMRS ports.

* * * * *